US012756063B2

(12) United States Patent
Hong et al.

(10) Patent No.: US 12,756,063 B2
(45) Date of Patent: Oct. 6, 2026

(54) BATTERY MODULE HAVING STRUCTURE FOR BLOCKING OXYGEN INFLOW DURING THERMAL PROPAGATION

(71) Applicant: LG ENERGY SOLUTION, LTD., Seoul (KR)

(72) Inventors: Sung-Goen Hong, Daejeon (KR); Seung-Hyun Kim, Daejeon (KR); Young-Hoo Oh, Daejeon (KR); Seung-Min Ok, Daejeon (KR); Sang-Hyun Jo, Daejeon (KR); Young-Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 612 days.

(21) Appl. No.: 18/269,515

(22) PCT Filed: Aug. 25, 2022

(86) PCT No.: PCT/KR2022/012753
§ 371 (c)(1),
(2) Date: Jun. 23, 2023

(87) PCT Pub. No.: WO2023/033458
PCT Pub. Date: Mar. 9, 2023

(65) Prior Publication Data

US 2024/0047820 A1 Feb. 8, 2024

(30) Foreign Application Priority Data

Aug. 30, 2021 (KR) ........................ 10-2021-0115112

(51) Int. Cl.
*H01M 50/00* (2021.01)
*H01M 50/211* (2021.01)
(Continued)

(52) U.S. Cl.
CPC ....... *H01M 50/383* (2021.01); *H01M 50/211* (2021.01); *H01M 50/271* (2021.01); *H01M 50/375* (2021.01)

(58) Field of Classification Search
CPC ............. H01M 50/383; H01M 50/211; H01M 50/271; H01M 50/375; Y02E 60/10
See application file for complete search history.

(56) References Cited

U.S. PATENT DOCUMENTS

2018/0287113 A1 10/2018 Son et al.
2019/0097192 A1 3/2019 Kim et al.
(Continued)

FOREIGN PATENT DOCUMENTS

CN 201779237 U * 3/2011
CN 111933852 A * 11/2020 ........ H01M 10/4207
(Continued)

OTHER PUBLICATIONS

Kim et al. Secondary Battery Having Vent Hole, Jul. 2011, See the Abstract. (Year: 2011).*
(Continued)

*Primary Examiner* — Tiffany Legette
*Assistant Examiner* — Monique M Wills
(74) *Attorney, Agent, or Firm* — Birch, Stewart, Kolasch & Birch, LLP

(57) ABSTRACT

A battery module may include a cell assembly having a plurality of battery cells; a module case provided to accommodate the cell assembly and having an opening on at least one side; and an oxygen inflow blocking cover covering the opening. The oxygen inflow blocking cover may include two or more partition walls each having a vent hole, overlapping each other, provided to cover the opening, and configured such that gas is discharged to the outside of the module case through the vent hole when the gas is generated in the cell
(Continued)

assembly; and a hole blocking member positioned between the partition walls and configured to block the vent hole by deforming its shape when heat is applied.

14 Claims, 11 Drawing Sheets

(51) Int. Cl.

| | |
|---|---|
| ***H01M 50/271*** | (2021.01) |
| ***H01M 50/375*** | (2021.01) |
| ***H01M 50/383*** | (2021.01) |

(56) References Cited

U.S. PATENT DOCUMENTS

| | | | | |
|---|---|---|---|---|
| 2020/0136111 | A1 | 4/2020 | Jiang et al. | |
| 2021/0050573 | A1 | 2/2021 | Lee | |
| 2021/0074975 | A1* | 3/2021 | Kwak | H01M 50/383 |
| 2021/0320374 | A1 | 10/2021 | Lee et al. | |
| 2022/0021060 | A1 | 1/2022 | Yoo et al. | |
| 2024/0154229 | A1 | 5/2024 | Kim et al. | |

FOREIGN PATENT DOCUMENTS

| | | | | |
|---|---|---|---|---|
| EP | 4 019 094 | A1 | 6/2022 | |
| EP | 4 027 404 | A1 | 7/2022 | |
| JP | 2009212081 | A * | 9/2009 | H01M 50/213 |
| JP | 2013-251127 | A | 12/2013 | |
| JP | 2015-153616 | A | 8/2015 | |
| JP | 2016-201333 | A | 12/2016 | |
| KR | 20110076361 | A * | 7/2011 | H01M 50/176 |
| KR | 10-2016-0123852 | A | 10/2016 | |
| KR | 10-2019-0022830 | A | 3/2019 | |
| KR | 10-2019-0036260 | A | 4/2019 | |
| KR | 10-2033101 | B1 | 10/2019 | |
| KR | 10-2057698 | B1 | 12/2019 | |
| KR | 10-2020-0107213 | A | 9/2020 | |
| KR | 10-2020-0107214 | A | 9/2020 | |
| KR | 10-2020-0143977 | A | 12/2020 | |
| KR | 10-2021-0055364 | A | 5/2021 | |
| KR | 10-2021-0063939 | A | 6/2021 | |
| WO | WO 2020/189965 | A1 | 9/2020 | |
| WO | WO 2021/091058 | A1 | 5/2021 | |

OTHER PUBLICATIONS

Cheng et al. Ventilation Plug Assembly, Mar. 2011, See the Abstract. (Year: 2011).*

Fujikawa et al. Battery Pack, Electronic Apparatus Equipped With the Same and Electronic Apparatus Equipped With Battery Housing Part, Sep. 2009, See the Abstract. (Year: 2009).*

Liu et al., Large Flexibly-packaged Battery Module, Assembling Method, Power Battery And Electric Vehicle, Nov. 2020, See the Abstract. (Year: 2020).*

International Search Report for PCT/KR2022/012753 (PCT/ISA/210) mailed on Nov. 30, 2022.

Extended European Search Report for European Application No. 22864961.2, dated Jul. 4, 2024.

* cited by examiner

BATTERY MODULE HAVING STRUCTURE FOR BLOCKING OXYGEN INFLOW DURING THERMAL PROPAGATION

TECHNICAL FIELD

The present application claims priority to Korean Patent Application No. 10-2021-0115112 filed on Aug. 30, 2021 in the Republic of Korea, the disclosures of which are incorporated herein by reference.

The present disclosure relates to a battery, and more specifically, to a battery module capable of effectively preventing the occurrence or spread of fire, and a battery pack and an energy storage system including the same.

BACKGROUND ART

As the demand for portable electronic products such as laptops, video cameras, and mobile phones has rapidly increased in recent years and the commercialization of robots, electric vehicles, and the like has begun in earnest, research on high-performance secondary batteries capable of repeated charge/discharge has been actively conducted.

Currently commercialized secondary batteries include nickel cadmium batteries, nickel hydride batteries, nickel zinc batteries, lithium secondary batteries, and the like. In particular, lithium secondary batteries are in the spotlight because they have almost no memory effect compared to nickel-based secondary batteries and thus have advantages of free charge/discharge, very low self-discharge rate, and high energy density.

The secondary battery may be used alone, but in general, a plurality of secondary batteries are electrically connected to each other in series and/or in parallel in many cases. In particular, a plurality of secondary batteries may be accommodated in one module case in a state of being electrically connected to each other to constitute one battery module. Also, the battery module may be used alone, or two or more may be electrically connected to each other in series and/or in parallel to constitute a higher level device such as a battery pack.

Recently, as issues such as power shortage or eco-friendly energy have been highlighted, an energy storage system (ESS) for storing the generated power is attracting more attention. Typically, if the energy storage system is used, it is easy to construct a system such as a smart grid system, and thus power supply and demand may be easily controlled in a specific region or city.

In case of a battery pack used in an energy storage system, a very large capacity may be required compared to a small and medium-sized battery pack. Therefore, the battery pack may usually include a large number of battery modules. Also, in order to increase the energy density, a plurality of battery modules are frequently configured in a dense form in a very narrow space.

However, when a plurality of battery modules exist in a dense state in a narrow space as described above, they may be vulnerable to fire. For example, a thermal propagation may occur in any one battery module, and a situation in which a high-temperature gas is discharged from at least one battery cell (secondary battery) may occur. Moreover, high-temperature sparks may be ejected when the gas is discharged, and the sparks may include active materials deintercalated from electrodes inside the battery cell or molten aluminum particles. If the high-temperature spark and the high-temperature gas are in contact with oxygen, a fire may occur in the battery pack.

Particularly, when a fire occurs in a specific battery cell or module, it may spread to other nearby battery cells or battery modules, other battery packs, and the like. Particularly, since many batteries are concentrated in a narrow space in the energy storage system, it is not easy to extinguish fire in the case of fire. Moreover, considering the size and role of the energy storage system, there is a risk that a fire inside the battery pack may cause very serious damage to property and human life. Therefore, even if a thermal propagation occurs in a specific battery cell or module, it is important not to proceed to a fire.

DISCLOSURE

Technical Problem

The present disclosure is designed to solve the problems of the related art, and therefore the present disclosure is directed to providing a battery module configured to effectively suppress the occurrence of fire even if high-temperature gas or sparks are generated therein due to a thermal propagation, and a battery pack and an energy storage system including the same.

However, technical problems to be solved by the present disclosure are not limited to the above-described problems, and other problems not mentioned herein may be clearly understood by those skilled in the art from the following description of the present disclosure.

Technical Solution

A battery module according to an aspect of the present disclosure for achieving the above object may include a cell assembly having a plurality of battery cells; a module case provided to accommodate the cell assembly and having an opening on at least one side; and an oxygen inflow blocking cover covering the opening, wherein the oxygen inflow blocking cover may include two or more partition walls each having a vent hole, overlapping each other, provided to cover the opening, and configured such that gas is discharged to an outside of the module case through the vent holes when the gas is generated in the cell assembly; and a hole blocking member positioned between the two or more partition walls and configured to block the vent holes by deforming when heat is applied.

The hole blocking member may be configured as a plastic injection molded plate-shaped body.

The two or more partition walls may include a first partition wall and a second partition wall overlapping each other with the hole blocking member interposed therebetween.

The hole blocking member may be a plate-shaped body and may have a gas passage hole through which gas may pass in a thickness direction, and the vent hole of the first partition wall, the gas passage hole, and the vent hole of the second partition wall may be aligned in a first direction.

A width of the gas passage hole may be less than a width of the vent hole of the first partition wall and a width of the vent hole of the second partition wall.

The width of the gas passage hole may decrease from the second partition wall to the first partition wall.

The hole blocking member may be a mesh net capable of melting at a predetermined temperature.

The two or more partition walls may include a first partition wall, a second partition wall, and a third partition wall disposed to face each other in three layers, and the hole blocking member may include a first hole blocking member disposed between the first partition wall and the second partition wall, and a second hole blocking member disposed between the second partition wall and the third partition wall.

The vent hole of the first partition wall and the vent hole of the second partition wall may be misaligned with each other, and the vent hole of the second partition wall and the vent hole of the third partition wall may be misaligned with each other, and the first hole blocking member and the second hole blocking member may have a porous structure.

The cell assembly may be a plurality of pouch-type battery cells stacked on each other.

The plurality of pouch-type battery cells may have electrode leads positioned in a front and rear direction of the module case, and the module case may have the opening on at least one of a front and a rear.

In addition, a battery pack according to another aspect of the present disclosure for achieving the above object may include the battery module according to the present disclosure.

In addition, an energy storage system according to another aspect of the present disclosure for achieving the above object may include the battery module according to the present disclosure.

Advantageous Effects

According to the present disclosure, the occurrence of fire in the battery module may be effectively prevented.

Particularly, according to an aspect of the present disclosure, even if a high-temperature gas or spark is generated due to a thermal propagation in a specific battery cell included in the battery module, it is possible not to proceed to a fire.

Moreover, according to an exemplary embodiment of the present disclosure, it is possible to prevent oxygen from flowing into the battery module while discharging the gas to the outside of the battery module. Therefore, by excluding oxygen, which is one of the three elements of combustion, it is possible to fundamentally block combustion, that is, the occurrence of fire inside the battery module.

Also, according to an aspect of the present disclosure, even if a fire occurs inside the battery module, the inflow of additional oxygen is blocked, and thus the fire may be quickly extinguished without spreading.

In addition, the present disclosure may have various other effects, which will be described in each embodiment, or the corresponding description will be omitted for effects that can be easily inferred by those skilled in the art.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
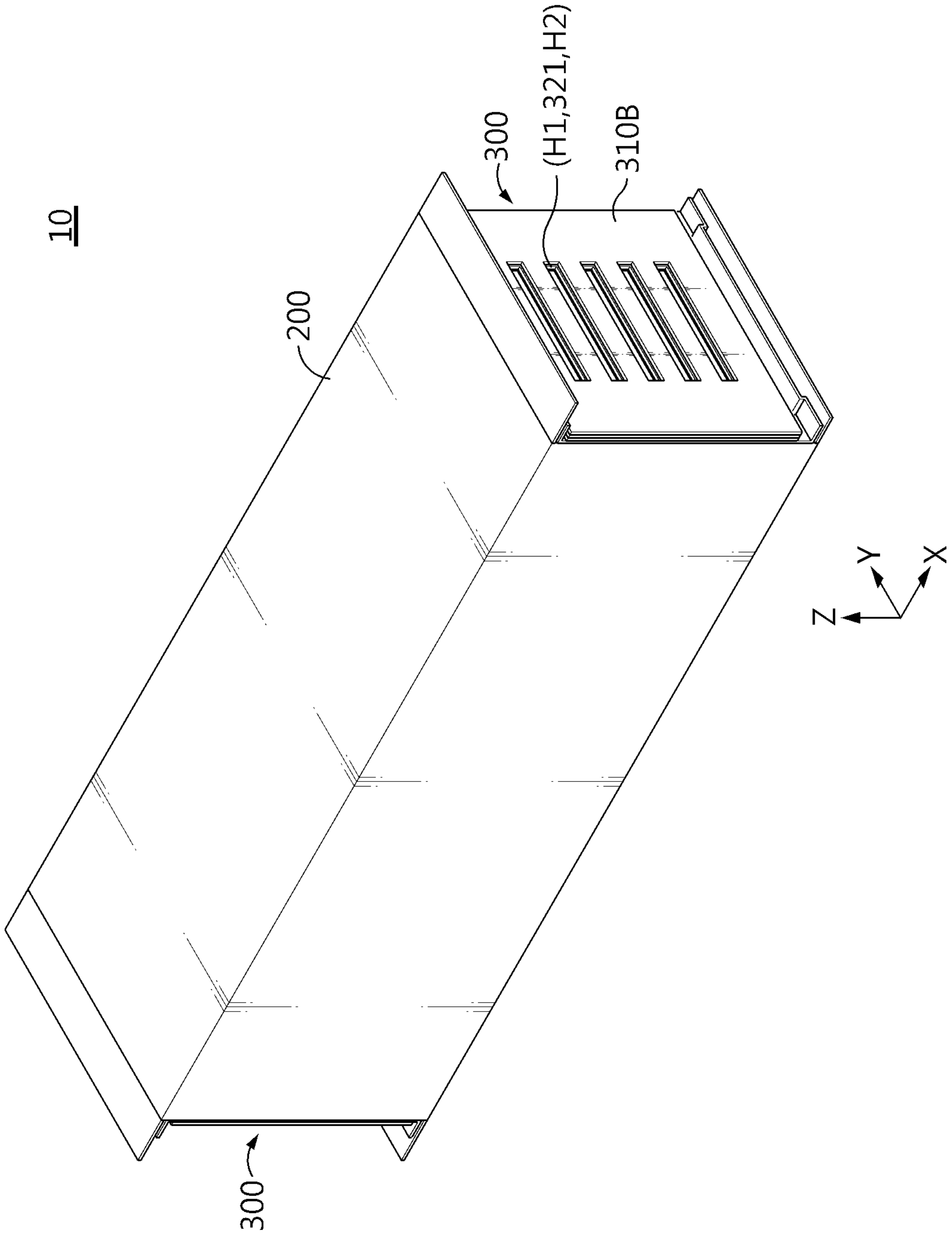
FIG. 1 is a schematic perspective view of a battery module according to an embodiment of the present disclosure.
Figure 2:
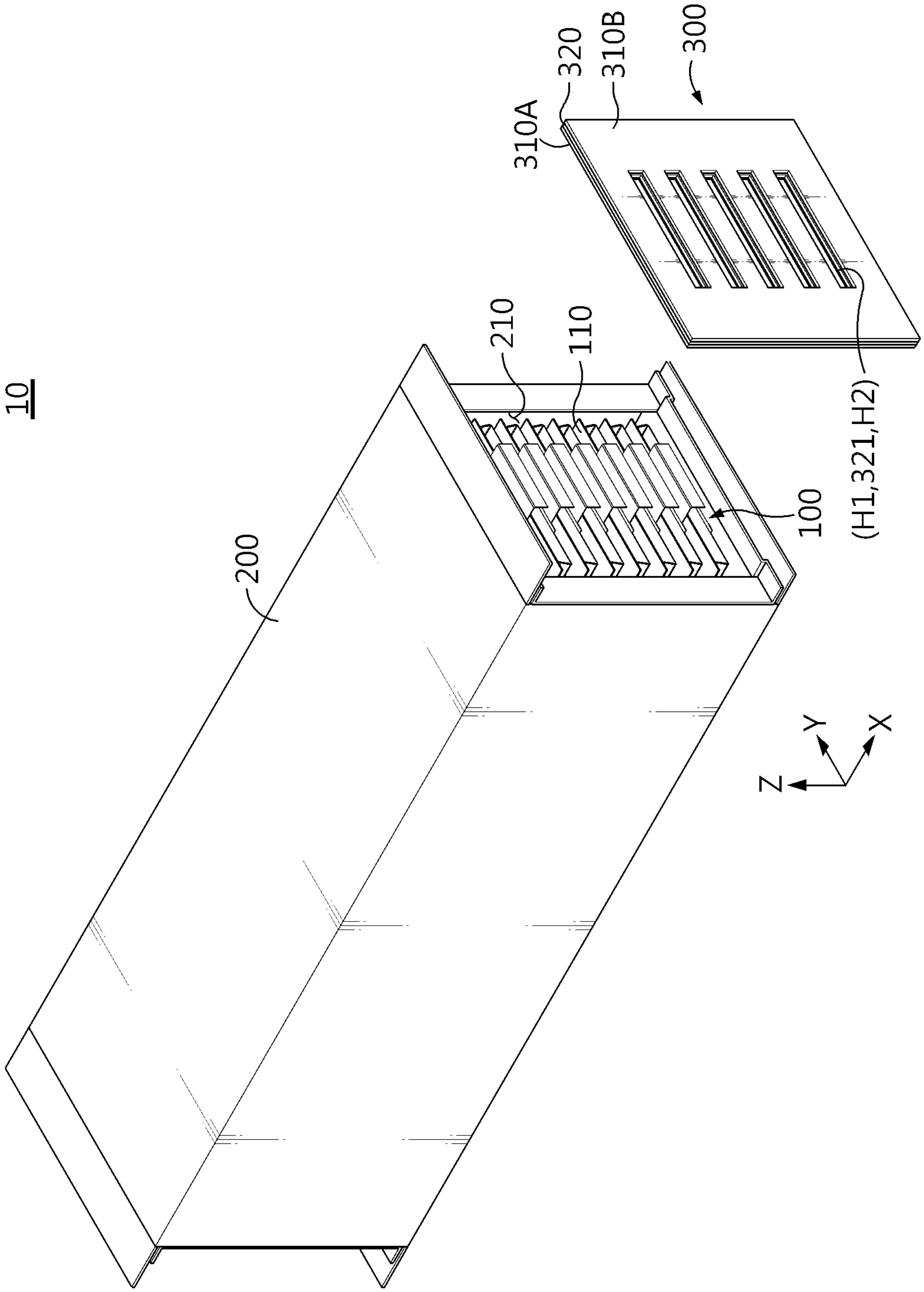
FIG. 2 is an exploded perspective view in which the module case and the oxygen inflow blocking cover of FIG. 1 are separated.
Figure 3:
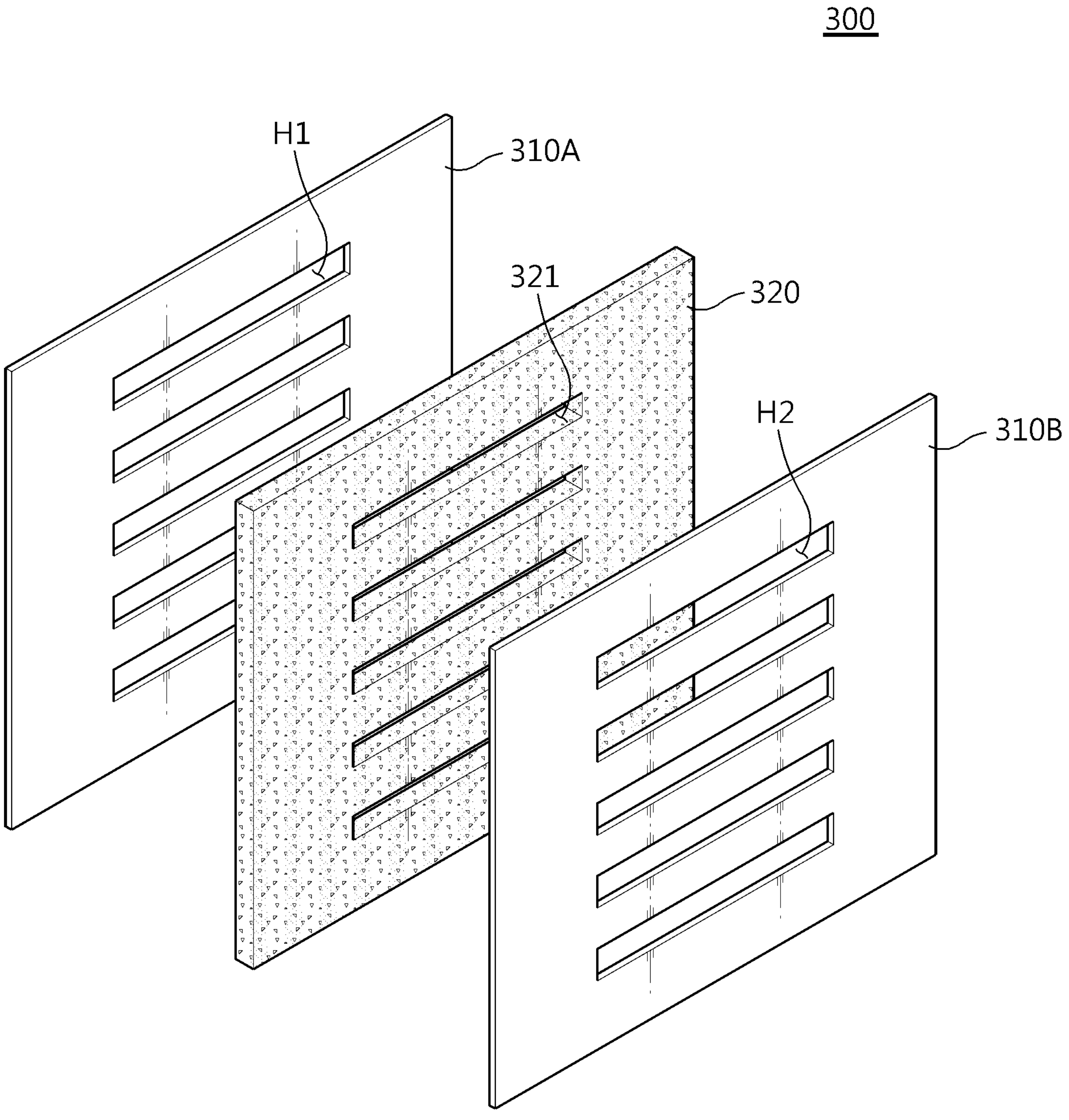
FIG. 3 is an exploded perspective view of the oxygen inflow blocking cover of FIG. 2.

FIG. 1 is a schematic perspective view of a battery module according to an embodiment of the present disclosure, FIG. 2 is an exploded perspective view in which the module case and the oxygen inflow blocking cover of FIG. 1 are separated, and FIG. 3 is an exploded perspective view of the oxygen inflow blocking cover of FIG. 2.

Referring to these drawings, the battery module 10 according to an embodiment of the present disclosure may include a cell assembly 100, a module case 200, and an oxygen inflow blocking cover 300.

The cell assembly 100 may include a plurality of battery cells 110. The battery cell 110 may include an electrode assembly, an electrolyte, and a battery case. As shown in FIG. 2, the cell assembly 100 may be composed of pouch-type battery cells 110. Of course, the cell assembly 100 need not necessarily be composed of the pouch-type battery cells 110. For example, the cell assembly 100 may be composed of a cylindrical battery cell or a prismatic battery cell.

The pouch-type battery cells 110 may be stacked on each other to form a cell assembly 100. For example, as shown in FIG. 2, a plurality of pouch-type battery cells 110 may be stacked in the vertical direction (Z-axis direction). Each pouch-type battery cell 110 has an electrode lead, and the electrode lead may be positioned at both ends or one end of each battery cell 110.

The battery cell 110 shown in FIG. 2 is a bidirectional cell, and electrode leads are positioned at both ends in the longitudinal direction (X-axis direction) of the battery cell 110. However, in the pouch-type battery cell 110, the electrode leads may be replaced with an electrode lead positioned at one end in the X-axis direction, for example, only at an end in the +X-axis direction. The present disclosure is not limited to a specific type or shape of the battery cell 110, and various battery cells 110 known at the time of filing of the present disclosure may be employed in the cell assembly 100 of the present disclosure.

The cell assembly 100 is accommodated in the module case 200 so that the electrode leads of the battery cells 110 face the front and rear of the module case 200, that is, both openings 210, and although not shown for convenience of drawing, a bus bar assembly (not shown) may be assembled at both ends along the longitudinal direction of the cell assembly 100 as a means for electrical connection of the battery cells 110. Here, the bus bar assembly may include an insulating plate having slots through which electrode leads may pass, and bus bars attached to one surface of the insulating plate and provided in the form of rods made of a metal material such as copper. For example, the electrode leads of one or more battery cells 110 are pulled out to the front of the insulating plate through the slot and welded to one side of a specific bus bar, and the electrode leads of other one or more battery cells 110 are pulled out to the front of the insulating plate through another slot and welded to the specific bus bar, whereby the battery cells 110 may be connected in series and/or in parallel.

The module case 200 may be configured to have an empty space therein and accommodate the cell assembly 100. In addition, the module case 200 may be formed in a predetermined length (along the X-axis direction), and may be configured in a substantially rectangular parallelepiped shape in which the openings 210 are provided at the front and rear in the longitudinal direction.

For convenience of description below, in the module case 200, the portions covering the upper and lower portions of the cell assembly 100 will be referred to as the upper plate and the lower plate, and the portions covering both side portions of the cell assembly 100 will be referred to as side plates (left plate and right plate).

For example, the upper plate and the side plates may be integrally formed into a U frame having a U-shaped cross section, and the lower plate may be provided in a plate shape in which both edge lines are bent in the upper direction so as to be coupled to the U frame by bolting or welding. As an alternative example, the module case 200 may be provided in the form of a mono frame where the upper plate, the lower plate, and the side plates are all integrated in a square tubular shape.

The module case 200 has a closed structure on all four sides except for the opening 210, and thus, when gas or sparks are generated in the cell assembly 100, the gas or sparks may move toward the opening 210 of the module case 200.

When gas is generated inside the module case 200 in a thermal propagation situation of the battery cells 110, the oxygen inflow blocking cover 300 is configured to prevent explosion due to an increase in internal pressure of the battery module 10 by discharging the gas to the outside of the module case 200 and to minimize a fire risk by blocking oxygen inflow into the module case 200 after discharging the gas.

The oxygen inflow blocking cover 300 may be provided as a pair in the front and rear of the module case 200, that is, in both openings 210 of the module case 200. The oxygen inflow blocking cover 300 may be configured to cover the entire opening 210 and be coupled to both ends of the module case 200. When the oxygen inflow blocking cover and the module case 200 are coupled, various methods such as welding, bolting, hook fastening, and bonding methods may be employed, and a sealing material such as an O-ring may be added to ensure airtightness.

Specifically, as shown in FIGS. 2 and 3, the oxygen inflow blocking cover 300 includes the first partition wall 310A and the second partition wall 310B having vent holes H1, H2, respectively, disposed to overlap each other and provided to cover the opening 210; and a hole blocking member 320 located between the first partition wall 310A and the second partition wall 310B and deformed to block the vent holes H1, H2 when heat is applied thereto.

The first partition wall 310A and the second partition wall 310B are made of a metal material having high mechanical rigidity or a material having excellent fire resistance, and the hole blocking member 320 may be made of, for example, a plastic (polymer) material that can be melted by heat. Also, the hole blocking member 320 may have gas passage holes 321.

The first partition wall 310A is provided in a plate shape that may cover the opening 210 of the module case 200 to serve to prevent sparks or flares from leaking out in a thermal propagation situation of the battery cells 110. However, the first partition wall has a plurality of vent holes H1 along the height direction (Z-axis direction) so that the gas may pass through the first partition wall 310A.

The second partition wall 310B may be disposed to overlap the first partition wall 310A with the hole blocking member 320 interposed therebetween, and may be provided substantially the same as the first partition wall 310A. The vent holes H2 of the second partition wall 310B may be provided in the same shape as the vent holes H1 of the first partition wall 310A and may be provided in plurality in the height direction (Z-axis direction) of the second partition wall 310B. Even when the first partition wall 310A and the second partition wall 310B are overlapped, the vent holes H1 of the first partition wall 310A and the vent holes H2 of the second partition wall 310B may be configured to match each other in the longitudinal direction (X-axis direction) of the battery module 10 so that gas may pass therethrough.

The hole blocking member 320 is configured in a plate shape having a predetermined thickness as a plastic injection molded product, and may be positioned between the first partition wall 310A and the second partition wall 310B so that one surface thereof is in face-to-face contact with the first partition wall 310A and the other surface thereof is in face-to-face contact with the second partition wall 310B. In addition, the hole blocking member 320 has a plurality of gas passage holes 321 provided along the height direction (Z-axis direction). The gas may pass through the hole blocking member 320 through the plurality of gas passing holes 321.

The gas passage hole 321 is provided at a height at least partially coincident with the vent hole H1 of the first partition wall 310A and the vent hole H2 of the second partition wall 310B. That is, as shown in FIG. 2, in a state where the first partition wall 310A, the hole blocking member 320, and the second partition wall 310B are sequentially overlapped, the vent hole H1 of the first partition wall 310A, the gas passage hole 321, and the vent hole H2 of the second partition wall 310B may be at least partially matched with each other. Therefore, when gas is generated inside the module case 200, the gas may be discharged to the outside of the battery module 10 through the vent hole H1 of the first partition wall 310A=>the gas passage hole 321 of the hole blocking member 320=>the vent hole H2 of the second partition wall 310B.

Meanwhile, since the hole blocking member 320 is made of a plastic injection material, the hole blocking member 320 may be melted and deformed when heat generated due to the thermal propagation of the battery cells 110 is transferred to the hole blocking member 320 at a certain level or more, or heat of the vented gas is transferred to the hole blocking member 320 at a certain level or more. The vent hole H1 of the first partition wall 310A and the vent hole H2 of the second partition wall 310B may be blocked by the shape deformation of the hole blocking member 320.

According to this configuration of the present disclosure, when gas is vented due to a thermal propagation or the like inside the battery module 10, the vented gas may be smoothly discharged to the outside of the battery module 10 through the vent holes H1, H2 and the gas passage hole 321. Therefore, it is possible to prevent explosion due to an increase in the internal pressure of the battery module 10. In addition, due to the heat transferred while the venting gas is discharged, the hole blocking member 320 melts and thus the vent hole H1 of the first partition wall 310A and the vent hole H2 of the second partition wall 310B are blocked, thereby effectively blocking the inflow of oxygen into the battery module 10 through the vent holes and the gas passage hole 321 after discharging the venting gas.

This will be described in more detail with reference to FIGS. 4 and 5.

Figure 4:
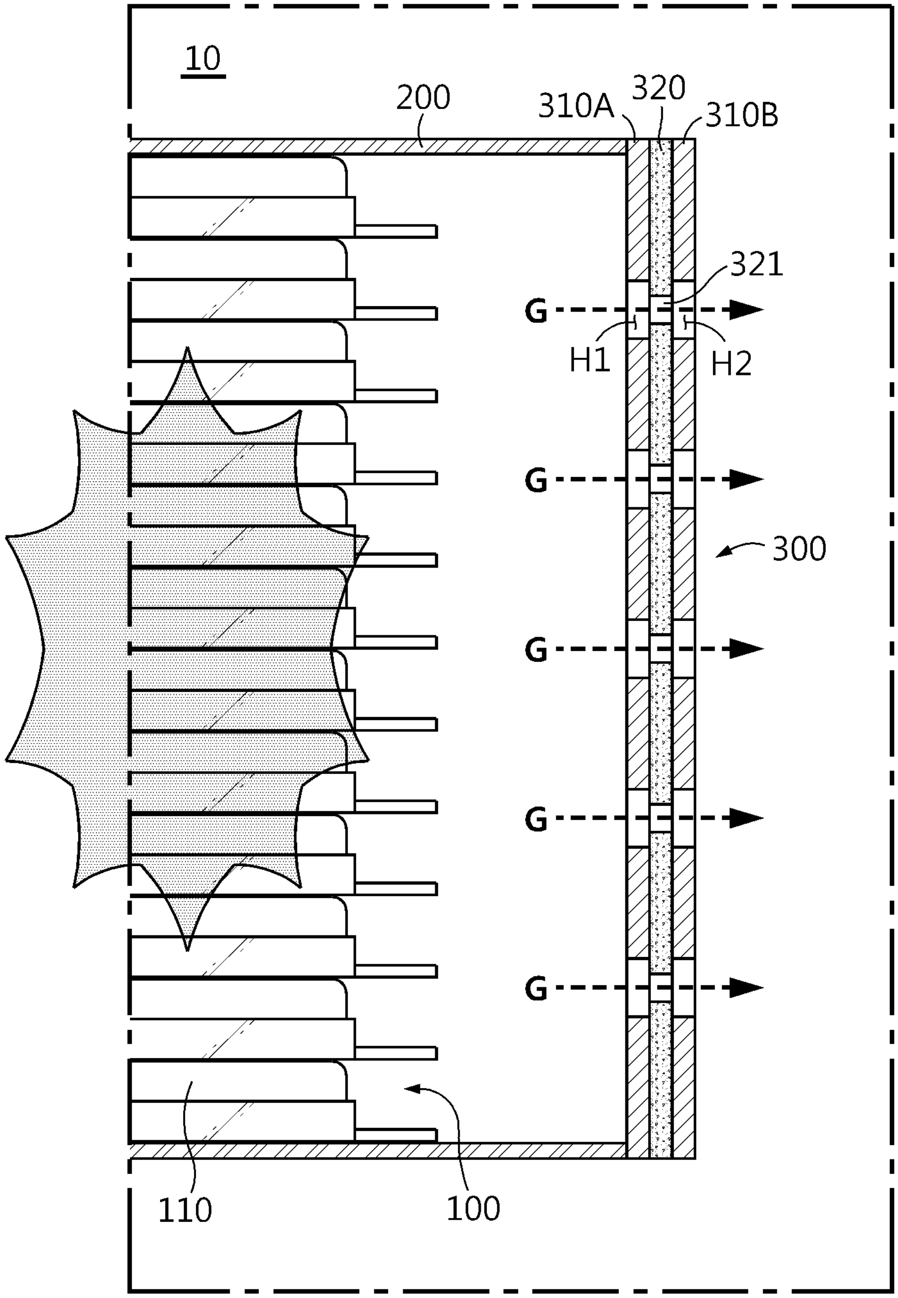
FIGS. 4 and 5 are views schematically illustrating the effects of discharging gas and blocking oxygen inflow when gas is generated inside the battery module according to an embodiment of the present disclosure.
Figure 5:
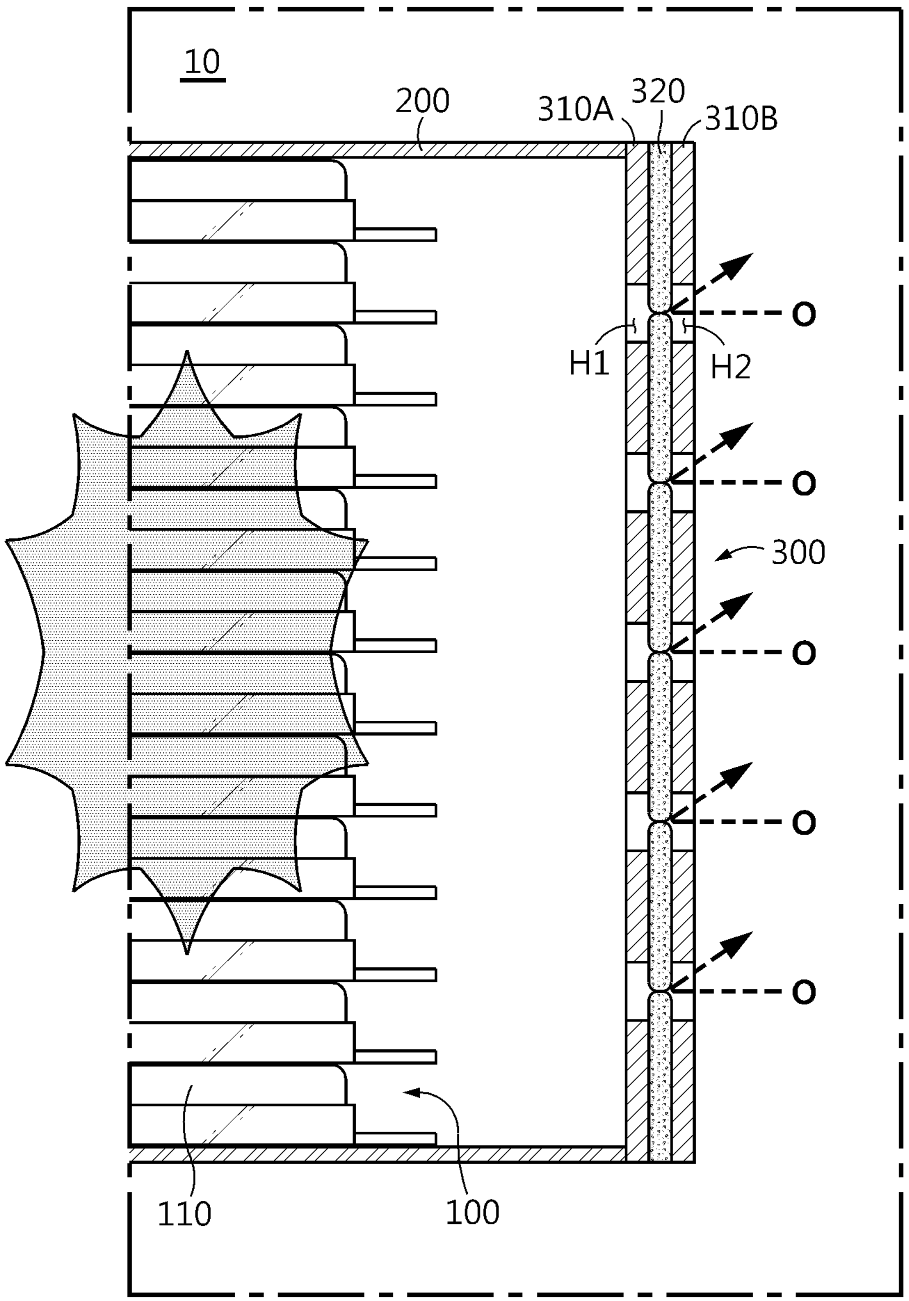

FIGS. 4 and 5 are views schematically illustrating the effects of discharging gas and blocking oxygen inflow when gas is generated inside the battery module according to an embodiment of the present disclosure.

As indicated by G of FIG. 4 in a thermal propagation situation of one or more battery cells 110, when gas is emitted from the battery cell 110, the emitted gas may move to the opening 210 of the module case 200. In the case of the gas indicated by G, it may be discharged to the outside of the battery module 10 by sequentially passing through the vent hole H1 of the first partition wall 310A=>the gas passage hole 321 of the hole blocking member 320=>the vent hole H2 of the second partition wall 310B.

In order to effectively transfer heat to the area around the gas passage hole 321 when the gas is discharged as described above, the gas passage hole 321 of the hole blocking member 320 may have a width formed narrower than that of the vent hole H1 of the first partition wall 310A and the vent hole H2 the second partition wall 310B. According to this configuration, heat is effectively transferred around the gas passage hole 321 of the hole blocking member 320, so that the shape of the corresponding portion may be easily deformed. Accordingly, as shown in FIG. 5, the vent hole H1 of the first partition wall 310A and the vent hole H2 of the second partition wall 310B are blocked, so that the inflow of oxygen from the outside to the inside of the battery module 10 may be blocked.

Figure 6:
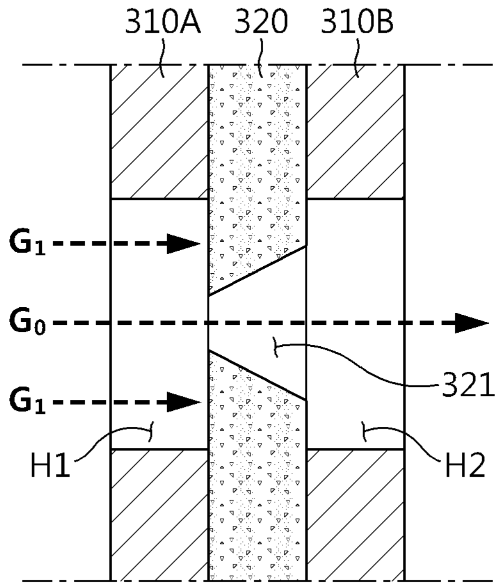
FIG. 6 is an enlarged view of a main portion as a modified example of FIG. 4.
Figure 7:
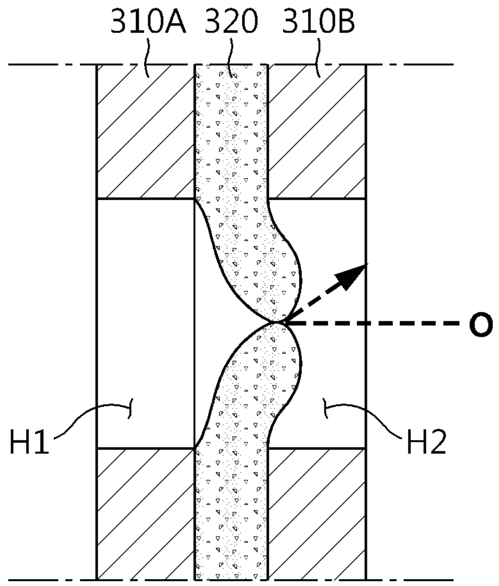
FIG. 7 is a view illustrating an example in which the shape of the hole blocking member of FIG. 6 is deformed by heat.

FIG. 6 is an enlarged view of a main portion as a modified example of FIG. 4, and FIG. 7 is a view illustrating an example in which the shape of the hole blocking member of FIG. 6 is deformed by heat.

As a modified example of FIG. 4, the gas passage hole 321 may be configured to have a vertical width gradually narrower as it approaches the vent hole H1 of the first partition wall 310A. According to the above configuration, the flow of the gas indicated by $G_0$ in FIG. 6 is unobstructed on the path, but, for example, in the case of the flow of the gas indicated by $G_1$, it is blocked by the gas passage hole 321. Accordingly, the temperature of the portion around the gas passage hole 321 is increased more rapidly, so that the corresponding portion may be effectively melted. However, since the gas discharge pressure acts in the right direction in the gas passage hole 321, a phenomenon in which the molten portion is concentrated in the right direction in FIG. 6, that is, in the direction of the vent hole H2 of the second partition wall 310B may occur. When such a concentration phenomenon is intensified, the molten portion is scattered out of the vent hole H2 of the second partition wall 310B together with the gas, thereby making it difficult to block the vent hole. Accordingly, this modified example is configured so that the upper and lower sides of the gas passage hole 321 may be fused more quickly when the surrounding plastic region is melted, by gradually narrowing the width of the gas passage hole 321 toward the vent hole H1 of the first partition wall 310A. After the upper and lower sides of the gas passage hole 321 are fused in this way, the viscosity of the molten portion is increased and thus it is not easily scattered out of the vent hole H2 of the second partition wall 310B. Accordingly, according to this modified example, the vent hole may be blocked more effectively.

Figure 8:
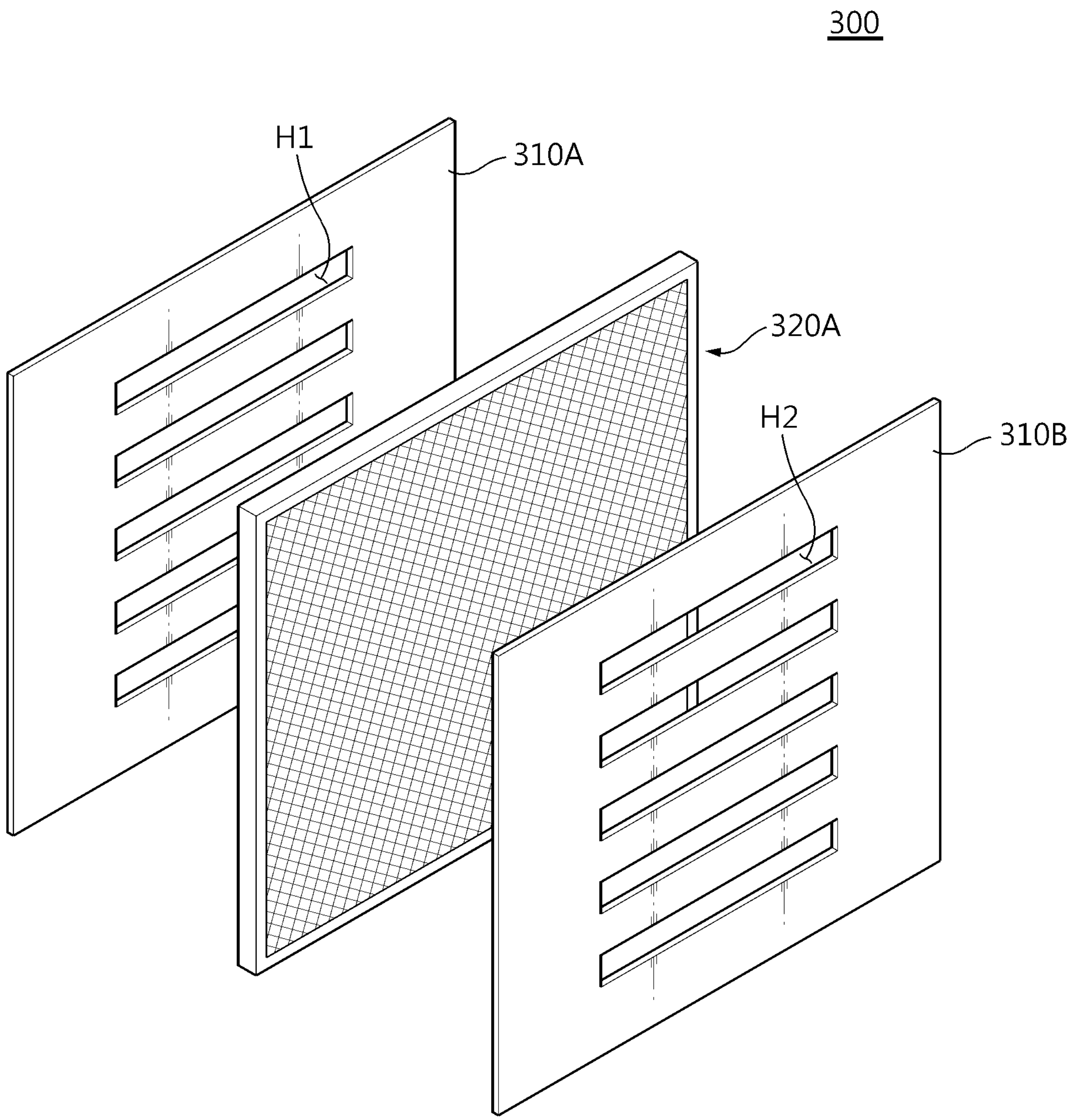
FIG. 8 is a view corresponding to FIG. 2 and illustrates a modified example of the oxygen inflow blocking cover.

Meanwhile, as an alternative to the hole blocking member 320 in the form of a plastic injection molded product having a gas passage hole 321, a hole blocking member 320A made of a mesh net made of a material capable of melting at a predetermined temperature may be employed, as shown in FIG. 8. In the case of the mesh net, it has better air permeability than the hole blocking member 320 in the form of a plastic injection molded product, thereby discharging gas more smoothly and better blocking the inflow or outflow of particle-type sparks or foreign substances.

According to the configuration of the battery module 10 and operation of the configuration according to an embodiment of the present disclosure as described above, the gas generated in the thermal propagation situation of a specific battery cell 110 may be discharged to the outside of the battery module 10, whereby it is possible to prevent explosion of the battery module 10 and also to prevent the spread of fire by blocking the inflow of oxygen after the gas is discharged. That is, the battery module 10 may have a heat source or combustibles such as a spark inside the battery module 10 in a thermal propagation situation, but the spread of internal fire in the battery module 10 may be prevented or significantly delayed when the inflow of oxygen, which is one of the three elements of combustion, is blocked as described above.

Figure 9:
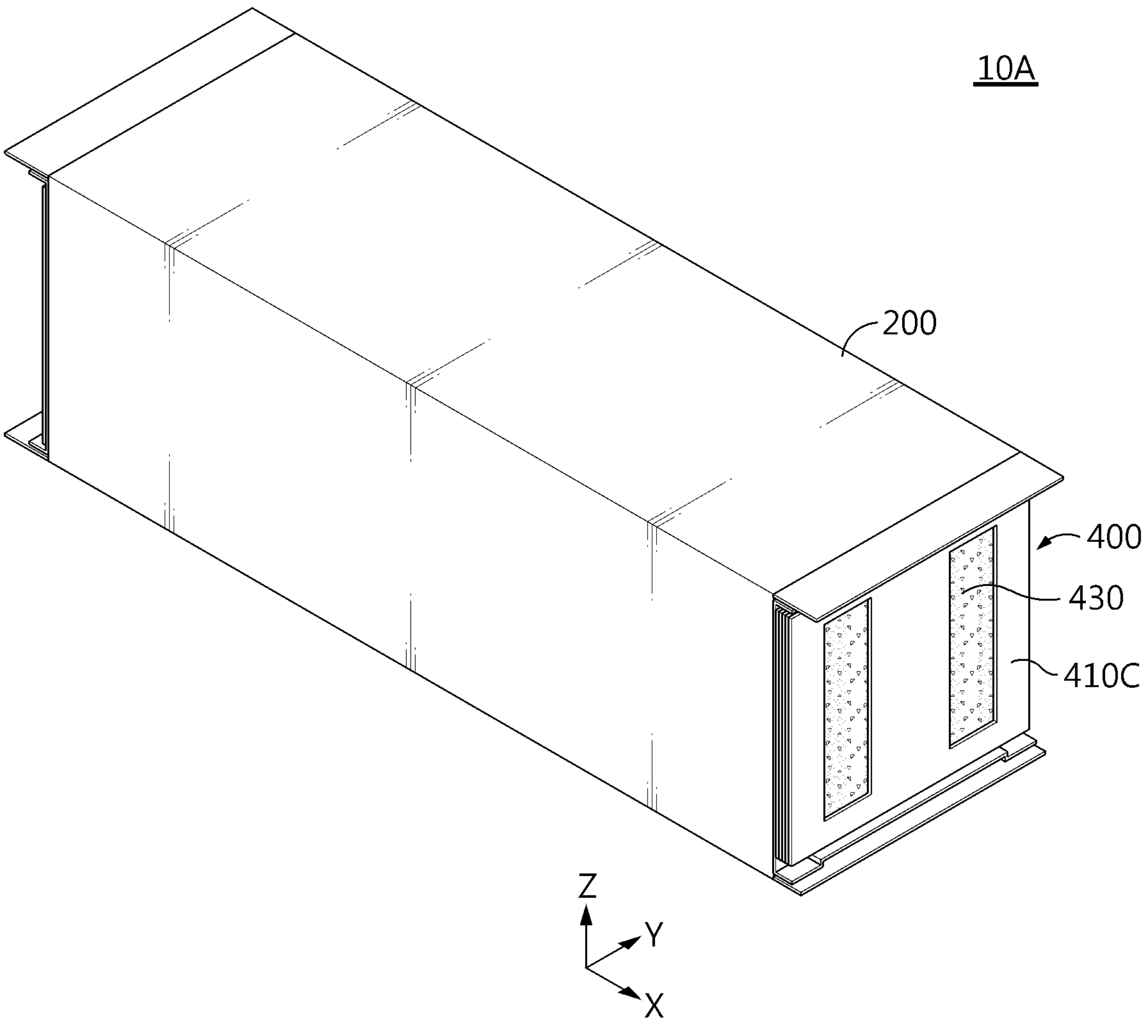
FIG. 9 is a schematic perspective view of a battery module according to another embodiment of the present disclosure.
Figure 10:
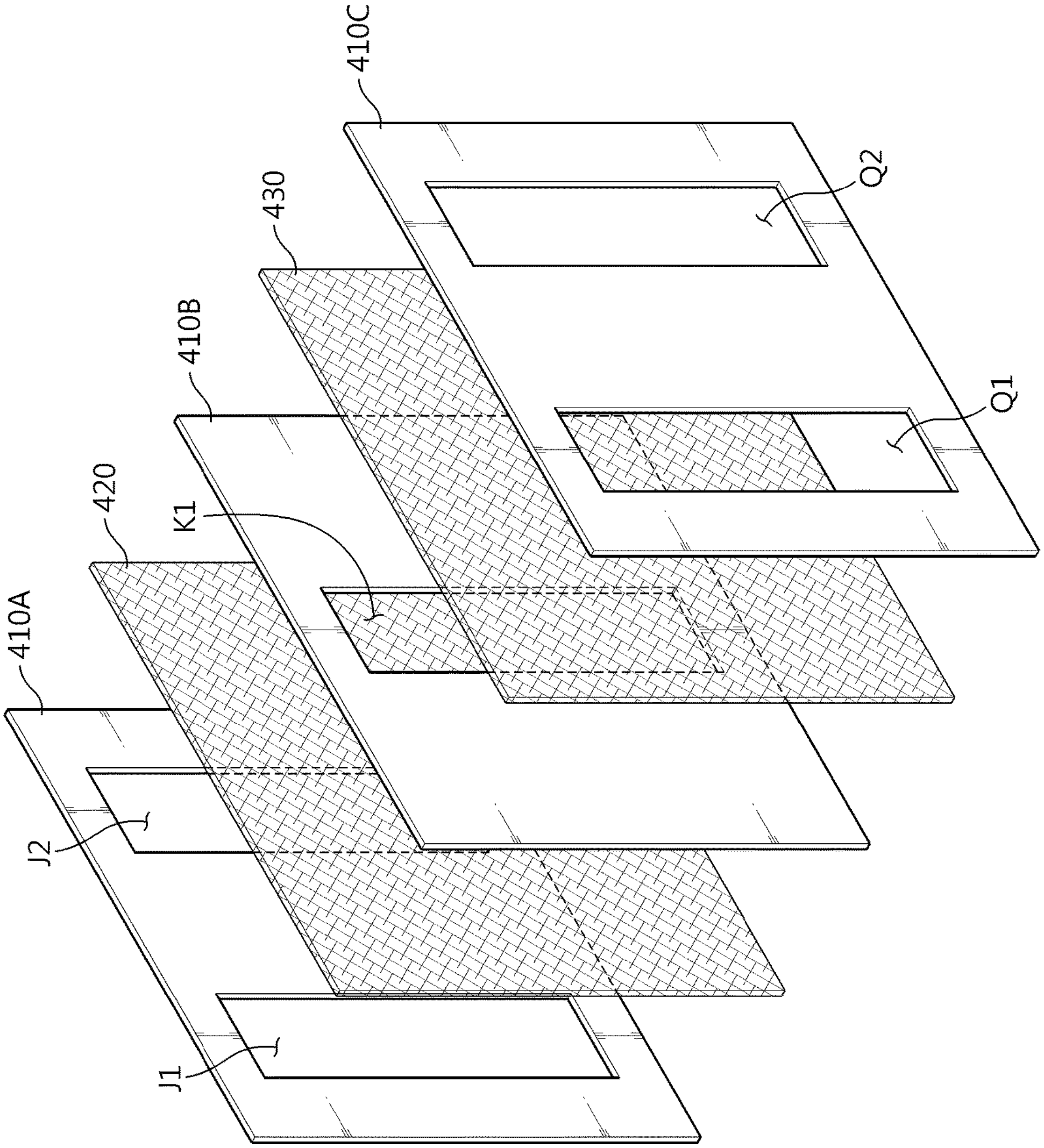
FIG. 10 is an exploded perspective view of the oxygen inflow blocking cover of FIG. 9.

FIG. 9 is a schematic perspective view of a battery module according to another embodiment of the present disclosure, and FIG. 10 is an exploded perspective view of the oxygen inflow blocking cover of FIG. 9.

Next, another embodiment of the present disclosure will be described with reference to the drawings.

The same reference numbers as those in the above-described embodiment represent the same members, and the repeated description of the same members will be omitted, but differences from the above-described embodiment will be mainly described.

When compared with the configuration of the above-described embodiment, the battery module 10A according to another embodiment of the present disclosure includes three partition walls 410A, 410B, 410C disposed in a triple overlap and two hole blocking members 420, 430 disposed between the three partition walls 410A, 410B, 410C. In addition, the two hole blocking members 420, 430 are formed in a porous structure.

Specifically, referring to FIG. 10, the oxygen inflow blocking cover 400 of the present disclosure includes a first partition wall 410A, a second partition wall 410B, and a third partition wall 410C that are disposed to face each other in triple. In addition, the oxygen inflow blocking cover 400 includes a first hole blocking member 420 disposed between the first partition wall 410A and the second partition wall 410B, and a second hole blocking member 430 disposed between the second partition wall 410B and the third partition wall 410C.

The vent holes J1, J2 of the first partition wall 410A may be provided to extend in the vertical direction (Z-axis direction) each one at both sides, the vent hole K1 of the second partition wall 410B may be provided to extend in the vertical direction (Z-axis direction) at a central portion so as to be misaligned with the vents J1, J2 of the first partition wall 410A, and the vent holes Q1, Q2 of the third partition wall 410C may be provided to extend in the vertical direction (Z-axis direction) each one at both sides so as to be misaligned with the vent hole K1 of the second partition wall 410B.

The first hole blocking member 420 and the second hole blocking member 430 may be made of a material that is heat-melted, such as a plastic resin, and may have a predetermined volume in a porous structure, for example, be in the form of a porous sponge, a porous foam, or web. The first hole blocking member 420 and the second hole blocking member 430 have air permeability not only in the thickness direction (X-axis direction) but also in the horizontal direction (Y-axis direction) and in the vertical direction (Z-axis direction).

According to the configuration of the oxygen inflow blocking cover 400 as described above, in a thermal propagation situation inside the battery module 10A, sparks or flares are prevented from being discharged to the outside while gas may be smoothly discharged to the outside. In addition, as in the above-described embodiment, the first hole blocking member 420 and the second hole blocking member 430 are configured to be deformed by heat, thereby blocking the oxygen inflow into the battery module 10A after gas is discharged.

This will be further described with reference to FIGS. 11 and 12.

Figure 11:
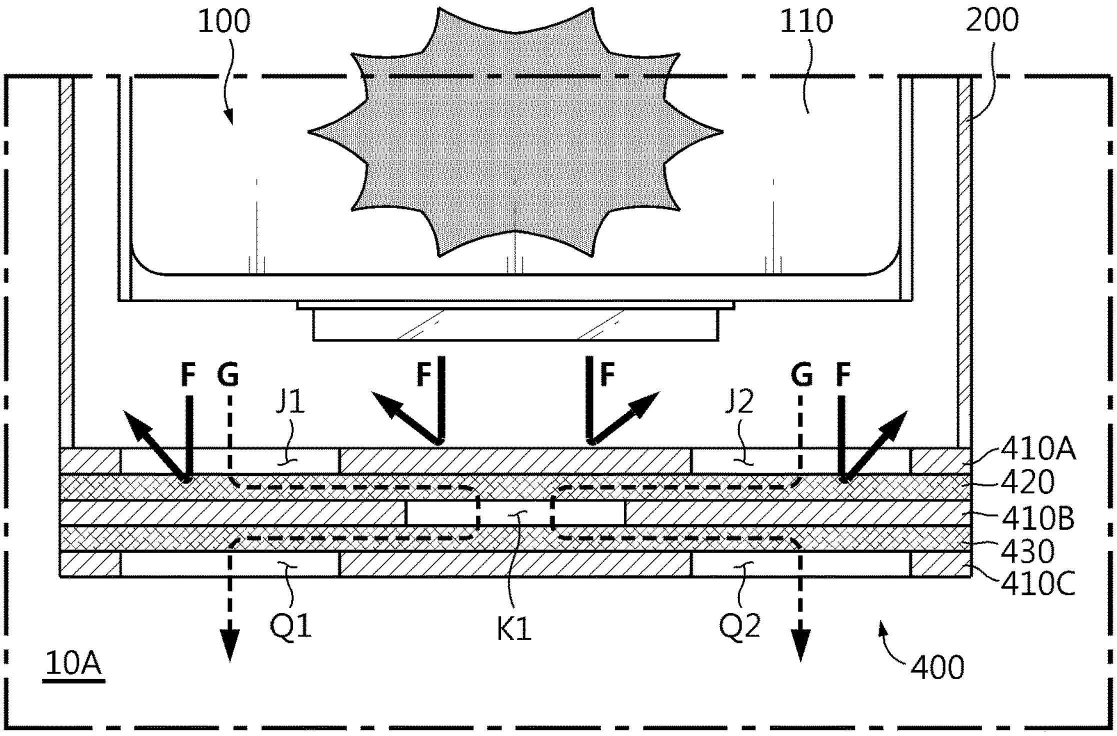
FIGS. 11 and 12 are views schematically illustrating the effects of discharging gas and blocking oxygen inflow when gas is generated inside the battery module according to another embodiment of the present disclosure.
Figure 12:
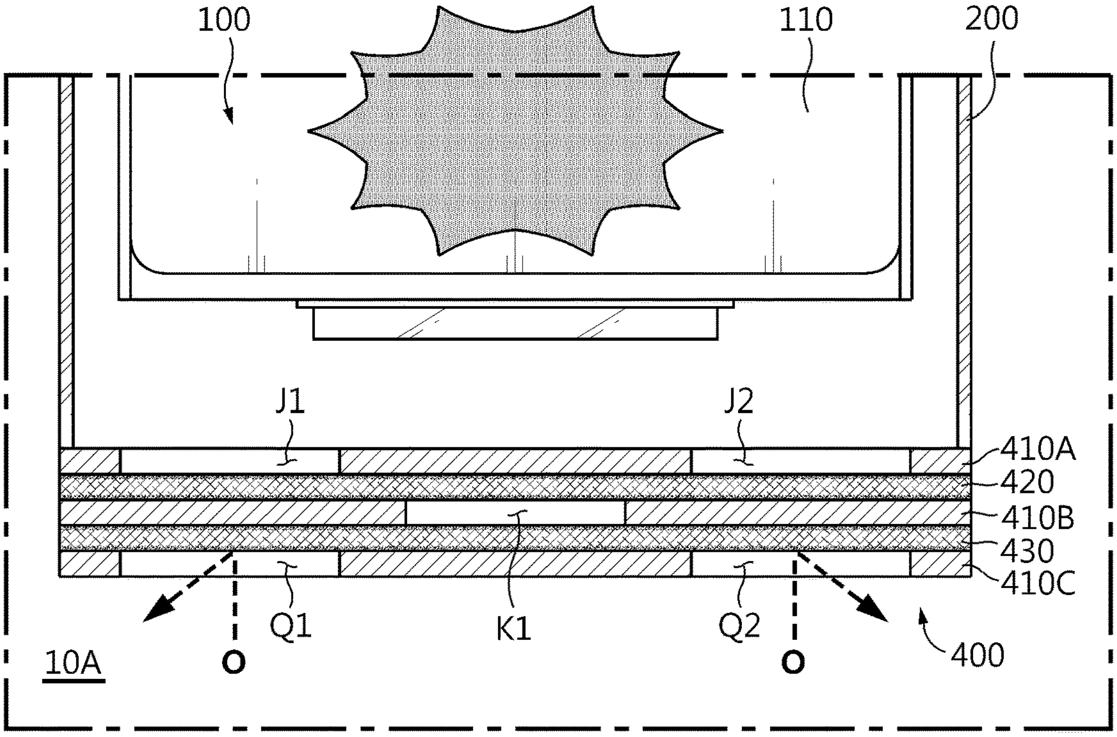
Figure 13:
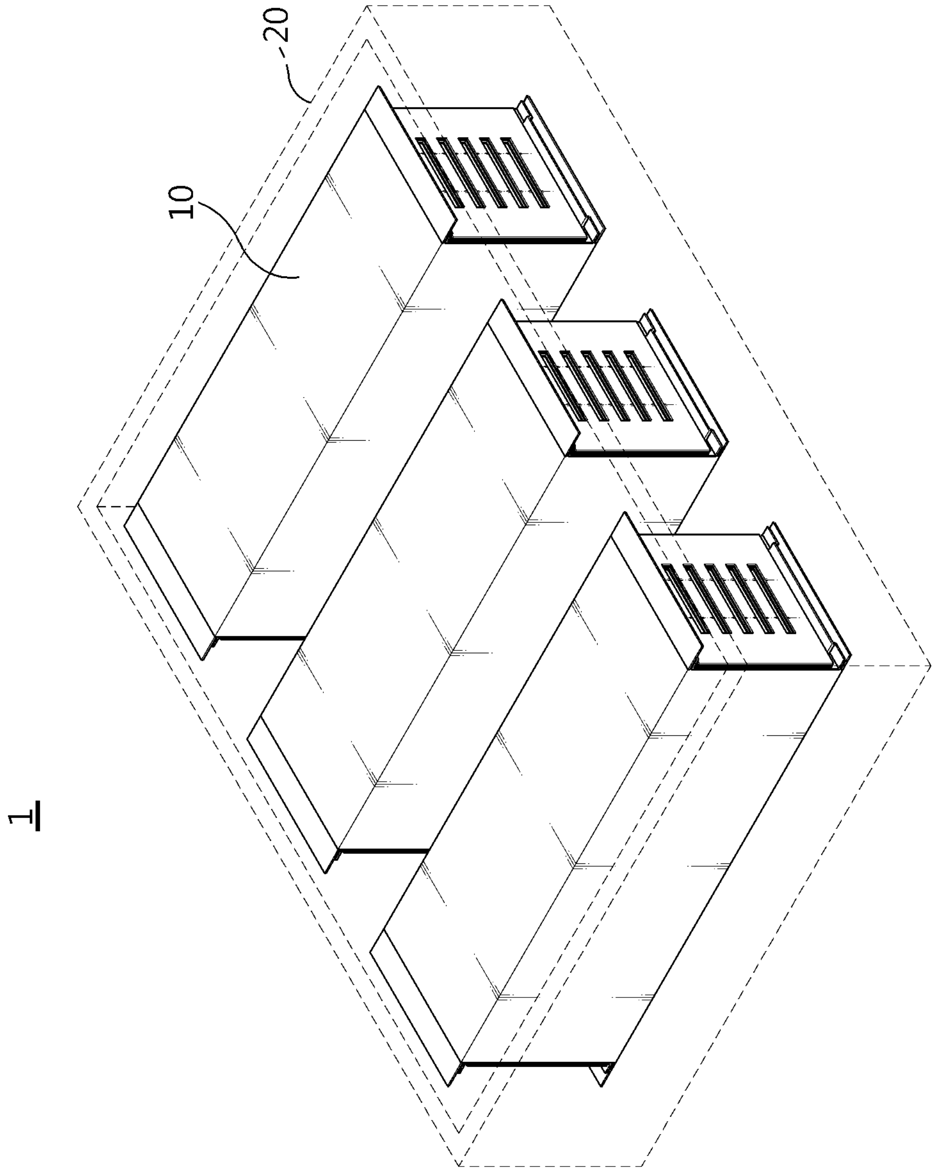
FIG. 13 is a view schematically illustrating a battery pack according to an embodiment of the present disclosure.

FIGS. 11 and 12 are views schematically illustrating the effects of discharging gas and blocking oxygen inflow when gas is generated inside the battery module according to another embodiment of the present disclosure.

When gas and sparks are emitted from the battery cell 110, the sparks indicated by F in FIG. 11 may be blocked by the first partition wall 410A or may be blocked by the second partition wall 410B even when passing through the vent holes J1, J2 of the first partition wall 410A. Moreover, since most of the sparks are in the form of particles, it is difficult to flow into the first hole blocking member 420 having a porous structure. In addition, since the present embodiment is composed of a triple partition wall, a complex route should be passed in order for sparks or flares to flow out to the outside. Therefore, sparks or flares are very difficult to leak to the outside in substance.

However, in the case of the gas indicated by G in FIG. 11, it may be discharged to the outside of the battery module 10A through the vent holes J1, J2 of the first partition wall 410A=>the first hole blocking member 420 having a porous structure=>the vent hole K1 of the second partition wall 410B=>the second hole blocking member 430 having a porous structure=>the vent holes Q1, Q2 of the third partition wall 410C.

After the gas is discharged, heat is transferred to the first hole blocking member 420 and the second hole blocking member 430 in the process of discharging the gas. Accordingly, at least one of the first hole blocking member 420 and the second hole blocking member 430 may be deformed in shape. That is, the first hole blocking member 420 or the second hole blocking member 430 may melt to collapse the porous structure, or to block the vent holes J1, J2 of the first partition wall 410A, the vent hole K1 of the second partition wall 410B, and the vent holes Q1, Q2 of the third partition wall 410C. At this time, as indicated by O in FIG. 12, the inflow of oxygen into the battery module may be blocked.

As described above, when compared with the above-described embodiment, the battery module 10A according to another embodiment of the present disclosure includes triple partition walls 410A, 410B, 410C, and the vent holes of each partition wall are positioned in a misaligned way, so that sparks and flares may not pass, and only gas may be discharged to the outside. In addition, after the gas is discharged, the hole blocking members are deformed by heat during the gas discharge process so that the vent holes may be blocked, thereby blocking the inflow of oxygen into the battery module 10A. As a result, it is possible to significantly reduce the risk of fire spread inside the battery module and outside the battery module 10A.

Meanwhile, the battery pack 1 according to the present disclosure may include a plurality of battery modules according to the present disclosure described above. Also, the battery pack 1 according to the present disclosure may further include various other components in addition to the battery module, such as a BMS or a bus bar, a pack case 20, a relay, a current sensor, and the like, which are components of the battery pack 1 known at the time of filing of the present disclosure.

The energy storage system according to the present disclosure may include one or more battery modules according to the present disclosure. Particularly, in order to have a large energy capacity, the energy storage system may include a plurality of battery modules according to the present disclosure in a form electrically connected to each other. Alternatively, a plurality of the battery modules according to the present disclosure constitute one battery pack 1, and an energy storage system may be configured in a form where a plurality of such battery packs are included. In addition, the energy storage system according to the present disclosure may further include other various components of the energy storage system known at the time of filing of the present disclosure. Moreover, such an energy storage system may be used in various places or devices, such as a smart grid system, an electric charging station, or the like.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

Meanwhile, the terms indicating directions as used herein such as upper, lower, left, and right are used for convenience of description only, and it is obvious to those skilled in the art that the terms may change depending on the position of the stated element or an observer.

What is claimed is:

1. A battery module comprising:

a cell assembly having a plurality of battery cells;

a module case provided to accommodate the cell assembly and having an opening on at least one side; and an oxygen inflow blocking cover covering the opening, wherein the oxygen inflow blocking cover comprises:

two or more partition walls each having a vent hole, overlapping each other, provided to cover the opening, and configured such that gas is discharged to an outside of the module case through the vent holes when the gas is generated in the cell assembly; and a hole blocking member positioned between the two or more partition walls and configured to block the vent holes by deforming when heat is applied.

2. The battery module according to claim 1, wherein the hole blocking member is a plastic injection molded plate-shaped body.

3. The battery module according to claim 1, wherein the two or more partition walls comprise a first partition wall and a second partition wall overlapping each other with the hole blocking member interposed therebetween.

4. The battery module according to claim 3, wherein the hole blocking member is a plate-shaped body and has a gas passage hole through which gas may pass in a thickness direction, and wherein the vent hole of the first partition wall, the gas passage hole, and the vent hole of the second partition wall are aligned in a first direction.

5. The battery module according to claim 4, wherein a width of the gas passage hole is less than a width of the vent hole of the first partition wall and a width of the vent hole of the second partition wall.

6. The battery module according to claim 5, wherein the width of the gas passage hole decreases from the second partition wall to the first partition wall.

7. The battery module according to claim 1, wherein the hole blocking member is a mesh net capable of melting at a predetermined temperature.

8. The battery module according to claim 1, wherein the two or more partition walls comprise a first partition wall, a second partition wall, and a third partition wall disposed to face each other in three layers, and wherein the hole blocking member comprises a first hole blocking member disposed between the first partition wall and the second partition wall, and a second hole blocking member disposed between the second partition wall and the third partition wall.

9. The battery module according to claim 8, wherein the vent hole of the first partition wall and the vent hole of the second partition wall are misaligned with each other, and the vent hole of the second partition wall and the vent hole of the third partition wall are misaligned with each other, and wherein the first hole blocking member and the second hole blocking member have a porous structure.

10. The battery module according to claim 1, wherein the cell assembly is a plurality of pouch-type battery cells stacked on each other.

11. The battery module according to claim 10, wherein the plurality of pouch-type battery cells have electrode leads positioned in a front and a rear direction of the module case, and wherein the module case has the opening on at least one of a front and a rear.

12. A battery pack comprising a battery module according to claim 1.

13. An energy storage system comprising a battery module according to claim 1.

14. The battery module according to claim 1, wherein the hole blocking member is configured to completely block the inflow of oxygen through the vent holes by deforming when heat is applied.

* * * * *